United States Patent
Lim

(10) Patent No.: US 9,450,980 B2
(45) Date of Patent: Sep. 20, 2016

(54) AUTOMATIC MALIGNANT CODE COLLECTING SYSTEM

(71) Applicant: WINS TECHNET CO., LTD, Seongnam-si (KR)

(72) Inventor: Tae Hui Lim, Gwangju (KR)

(73) Assignee: WINS CO., LTD., Seongnam-Si (KR)

( * ) Notice: Subject to any disclaimer, the term of this patent is extended or adjusted under 35 U.S.C. 154(b) by 0 days.

(21) Appl. No.: 14/144,383

(22) Filed: Dec. 30, 2013

(65) Prior Publication Data

US 2014/0283084 A1    Sep. 18, 2014

(30) Foreign Application Priority Data

Mar. 12, 2013  (KR) .................. 10-2013-0025911

(51) Int. Cl.
*H04L 29/06*    (2006.01)
*G06F 9/455*    (2006.01)

(52) U.S. Cl.
CPC ....... *H04L 63/1433* (2013.01); *G06F 9/45558* (2013.01); *G06F 2009/45587* (2013.01); *H04L 63/145* (2013.01)

(58) Field of Classification Search
CPC . H04L 63/1433; H04L 63/145; H04L 67/02; G06F 9/455; G06F 9/45533
See application file for complete search history.

(56) References Cited

U.S. PATENT DOCUMENTS

2012/0174224 A1* 7/2012 Thomas et al. .................. 726/24
2012/0304244 A1* 11/2012 Xie et al. ........................... 726/1
2014/0026231 A1* 1/2014 Barak ................. G06F 9/45558
                                                              726/29

* cited by examiner

*Primary Examiner* — Hadi Armouche
*Assistant Examiner* — Andrew Steinle
(74) *Attorney, Agent, or Firm* — Joseph Hyosuk Kim; JHK Law

(57) ABSTRACT

An automatic malignant code collecting system comprises a first database configured to store detection target website information, a virtual machine controller configured to read the website information from the first database and transmit the website information, a first virtual machine configured to periodically gain access to a website using the website information and to collect a malignant code and evidence thereof if an abnormal event occurs when the first virtual machine gains access to the website, a second virtual machine configured to periodically gain access to the same website as accessed by the first virtual machine using the website information received from the virtual machine controller and to collect a malignant code and evidence thereof if an abnormal event occurs when the second virtual machine gains access to the website, and a second database configured to store the malignant code and the evidence thereof collected by the first virtual machine and the second virtual machine.

6 Claims, 2 Drawing Sheets

AUTOMATIC MALIGNANT CODE COLLECTING SYSTEM

FIELD OF THE INVENTION

The present embodiments relate to a network security technology and, more particularly, to a system for automatically detecting malignant code disseminating acts performed in websites and automatically collecting a malignant code disseminated through websites.

BACKGROUND OF THE INVENTION

A malignant code refers to software which is intentionally produced to carry out malicious activities such as system destruction and information outflow against the intention and interest of a user.

A myriad of malignant codes are produced everyday and are predominantly disseminated through websites. Malignant codes come out into the world by detouring vaccines or passing through vaccine tests. Thus, difficulties are involved in detecting the installation and execution of malignant codes.

In particular, an exploit code, one of malignant codes having aggressive characteristics, is hidden in a website showing a vulnerable security level and is disseminated to users who gain access to the website. The exploit code is often written in JavaScript and is usually made hard to read by virtue of code obfuscation. In some cases, the exploit code has a property of being dynamically changed each time when a user pays a visit to the website. Such an exploit code makes it difficult to perform a patterning work for the detection thereof with a vaccine. In most cases, dynamically changing codes cannot be detected by a vaccine.

One of methods for coping with malignant codes is to rapidly collect information on the latest malignant codes. Failure to quickly collect samples of malignant codes makes it hard for a vaccine to detect the installation and execution of malignant codes in advance.

Nowadays, most of information security companies collect malignant code information in a passive manner by sharing information with relevant organizations or by relying on users' reports. It is therefore impossible to rapidly cope with the generation and dissemination of malignant codes.

SUMMARY OF THE INVENTION

In view of the aforementioned situations, disclosed automatic malignant code collecting system can automatically collect malignant codes such as an exploit code and the like which are disseminated through websites.

And disclosed automatic malignant code collecting system can actively and frequently check websites visited by users, rapidly collect malignant codes disseminated through websites and consequently shorten the time required in coping with malignant codes.

And disclosed automatic malignant code collecting system can automatically visit websites using a web browser under a virtual machine environment and collect evidence such as malignant files and network packets which are automatically downloaded and executed by malignant codes including an exploit code.

According to one aspect of the disclosed embodiment, there is provided an automatic malignant code collecting system, comprising: a first database configured to store detection target website information; a virtual machine controller configured to read the website information from the first database and transmit the website information; a first virtual machine configured to periodically gain access a website using the website information received from the virtual machine controller and to collect a malignant code and evidence thereof if an abnormal event occurs when the first virtual machine gains access to the website; a second virtual machine configured to periodically gain access the same website as accessed by the first virtual machine using the website information received from the virtual machine controller and to collect a malignant code and evidence thereof if an abnormal event occurs when the second virtual machine gains access to the website; and a second database configured to store the malignant code and the evidence thereof collected by the first virtual machine and the second virtual machine.

The virtual machine controller may be configured to transmit the website information to the first virtual machine if the first virtual machine is in a standby state and to transmit the website information to the second virtual machine if the second virtual machine is in a standby state.

The virtual machine controller may be configured to simultaneously transmit the website information to the first virtual machine and the second virtual machine if the first virtual machine and the second virtual machine are in a standby state.

The first virtual machine and the second virtual machine may be set at different security levels.

The second virtual machine may be set at a highest security level at which a latest security patch is installed in the second virtual machine.

The system may further comprise: a management server including a user interface that enables a user to identify website-based malignant codes and evidence thereof stored in the second database.

The management server may further comprise a security support interface configured to automatically install a security patch having a latest security level in the second virtual machine and to automatically update the security patch installed in the second virtual machine.

The management server may be configured to find out a latest malignant code and the evidence thereof depending on the difference between a security level set in the first virtual machine and a latest security level set in the second virtual machine and to store the latest malignant code and the evidence thereof independently of the malignant code and the evidence thereof collected under the security level set in the first virtual machine.

The first virtual machine and the second virtual machine may be configured to collect an execution file and a network packet, which are generated at the occurrence of the abnormal event, as the malignant code and the evidence thereof.

Prior to gaining access to the website, the first virtual machine and the second virtual machine may be configured to perform initialization for erasing past access history and past data generated during past access to the website.

The present embodiments can provide the following advantageous effects.

First, the automatic malignant code collecting system according to the present embodiments can automatically collect malignant codes, such as an exploit code and the like, which are disseminated through websites.

Second, the automatic malignant code collecting system according to the present embodiments can actively and frequently check websites visited by users and can rapidly collect malignant codes disseminated through websites. This makes it possible to shorten the time required in coping with malignant codes.

Third, the automatic malignant code collecting system according to the present embodiments can automatically visit websites using a web browser under a virtual machine environment and can collect evidence such as malignant files and network packets which are automatically downloaded and executed by malignant codes including an exploit code.

Fourth, the information on malignant codes including an exploit code is collected through the use of virtual machine environments differing in security level from each other, namely through the additional use of a virtual machine environment that makes use of a latest security patch. This makes it possible to divisionally collect the information on malignant codes including a latest exploit code. It is therefore possible to rapidly cope with the generation of malignant codes.

Fifth, the automatic malignant code collecting system according to the present embodiments actively collects a malignant code and the evidence thereof by periodically gaining access to a website and monitoring the website. This makes it possible to detect and cope with an origin (source) of a malignant code. Particularly, it is possible to easily detect a polymorphic code which changes itself each time it runs.

BRIEF DESCRIPTION OF THE DRAWINGS

Other objects, features and advantages of the present invention will become more apparent from the following description of embodiments given in conjunction with the accompanying drawings.

DETAILED DESCRIPTION

Figure 1:
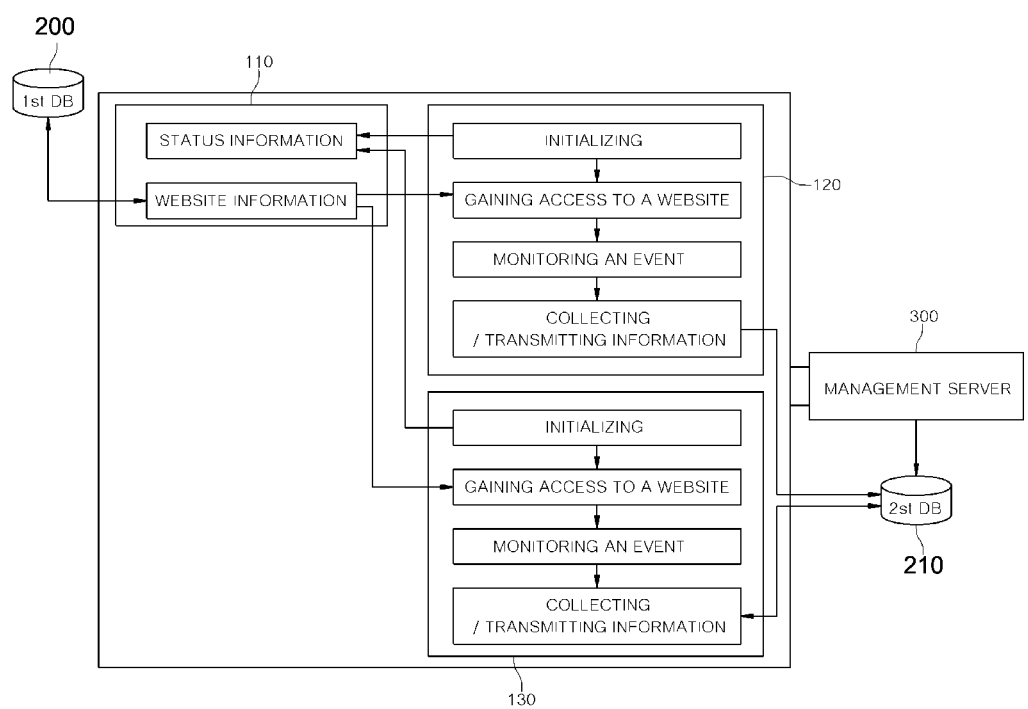
FIG. 1 is a diagram showing the configuration of an automatic malignant code collecting system according to the present embodiment.

Embodiments of the present invention will now be described with reference to the accompanying drawings. The configuration and operation of the present invention shown in the drawings and described herein below are presented by way of example and are not intended to limit the scope of the present invention.

FIG. 1 is a diagram showing the configuration of an automatic malignant code collecting system according to the present embodiment. Referring to FIG. 1, the automatic malignant code collecting system according to the present embodiment comprises a virtual machine controller 110, first and second virtual machines 120 and 130, and first and second databases 200 and 210.

The virtual machine controller 110 reads website information on detection target websites from the first database 200 and transmits the website information to the first and second virtual machines 120 and 130.

The first virtual machine 120 periodically gains access to a website using the website information received from the virtual machine controller 110 and collects a malignant code and the evidence thereof at the occurrence of an abnormal event during the access to the website.

The second virtual machine 130 periodically gains access to the same website as accessed by the first virtual machine 120 using the website information received from the virtual machine controller 110 and collects a malignant code and the evidence thereof at the occurrence of an abnormal event during the access to the website.

The period at which the first virtual machine 120 and the second virtual machine 130 gain access to a detection target website can be differently set depending on the kind of a system, e.g., on a day-by-day basis or on a hour-by-hour basis.

The first virtual machine 120 and the second virtual machine 130 are software, e.g., VMware, which can virtually realize a computer for executing a specific program.

The virtual machine controller 110 periodically checks the status information of the first virtual machine 120 and the second virtual machine 130.

The virtual machine controller 110 checks the status information of the first virtual machine 120. If the first virtual machine 120 is in a standby state, the virtual machine controller 110 transmits the website information to the first virtual machine 120. Furthermore, the virtual machine controller 110 checks the status information of the second virtual machine 130. If the second virtual machine 130 is in a standby state, the virtual machine controller 110 transmits the website information to the second virtual machine 130.

As an example, the virtual machine controller 110 checks the status information of the first virtual machine 120 and the second virtual machine 130. If both the first virtual machine 120 and the second virtual machine 130 are in a standby state, the virtual machine controller 110 simultaneously transmits the website information to the first virtual machine 120 and the second virtual machine 130.

The standby state refers to an initialized state which will be described later, namely an initialized state in which the past access history and the past data generated during the past access to the detection target website are erased prior to gaining access to the detection target website.

The first virtual machine 120 and the second virtual machine 130 are set at different security levels. Description will now be described on certain examples in which different security levels are set in the first virtual machine 120 and the second virtual machine 130.

Taking one example, the second virtual machine 130 is set at a highest security level at which the latest security patch is installed. In contrast, the first virtual machine 120 is set at a lower security level at which a security patch of lower version is installed instead of the latest security patch.

Taking another example, the second virtual machine 130 is set at a highest security level at which the latest security patch is installed. In contrast, the first virtual machine 120 is set at a lowest security level at which no security patch is installed.

The security level setting is decided depending on whether a security patch is installed in a program employed by the first virtual machine 120 and the second virtual machine 130. The program used herein may be a website access program such as a web browser or the like, or may be a plug-in program such as Java, Flash Player or Adobe Reader.

For example, Internet Explorer Version 8 is installed as a web browser in the first virtual machine 120. The first virtual machine 120 is set at a vulnerable security level at which no security patch is applied to a plug-in program. On the other hand, Internet Explorer Version 9 is installed as a web browser in the second virtual machine 130. The second virtual machine 130 is set at a highest security level at which the latest security patch is applied to a plug-in program.

Based on their own security levels set as above, the first virtual machine 120 and the second virtual machine 130 collect an execution file and a network packet generated at the occurrence of an abnormal event, as a malignant code and the evidence thereof.

The first virtual machine 120 and the second virtual machine 130 perform initialization prior to collecting a malignant code and the evidence thereof, particularly prior to gaining access to a detection target website. In other words, the first virtual machine 120 and the second virtual machine 130 perform initialization for erasing the past access history and the past data generated during the past access to the same website as will be accessed this time. Examples of the past access history and the past data to be erased include temporary files, a list of visited web pages and cookie information.

The automatic malignant code collecting system according to the present embodiments may further comprise a management server 300 which takes part in the setting of the security levels of the first virtual machine 120 and the second virtual machine 130.

The management server 300 monitors the security levels of the first virtual machine 120 and the second virtual machine 130 through an interface which makes real-time communication with the first virtual machine 120 and the second virtual machine 130. Depending on the monitoring result, the management server 300 sets the security levels of the first virtual machine 120 and the second virtual machine 130.

In particular, the management server 300 comprises a security support interface which, while monitoring the security level of the second virtual machine 130, automatically installs a security patch having the latest security level in the second virtual machine 130 and automatically updates the security patch so that the second virtual machine 130 can maintain the latest security level.

The security support interface of the management server 300 automatically installs a security patch having a security level lower than the security level of the second virtual machine 130 in the first virtual machine 120 and automatically updates the security patch. Alternatively, the security support interface may not install and update a security patch so that the first virtual machine 120 can be maintained at a lowest security level.

The first database 200 stores the website information on detection target websites. The website information may preferably be identification information including a URL (Uniform Resource Locator) or an IP (Internet protocol). In general, the website information can be regarded as a website address.

The second database 210 stores the malignant codes and the evidence thereof which are collected by the first virtual machine 120 and the second virtual machine 130. Examples of the evidence mentioned above include the address of a website which disseminates a malignant code, the malignant code thus disseminated, and the file and network packet generated by the execution of the malignant code.

In the meantime, the management server 300 may provide a user interface that enables a user to identify, on a website-by-website basis, the malignant codes and the evidence thereof stored in the second database 210. Upon request, the management server 300 reads the malignant code of a specific website and the evidence thereof from the second database 210 and outputs the malignant code of a specific website and the evidence thereof through the user interface.

Furthermore, the management server 300 finds out the latest malignant code and the evidence thereof from the malignant codes and evidence collected depending on the difference between the security level of the first virtual machine 120 and the latest security level of the second virtual machine 130. The management server 300 stores the latest malignant code and the evidence thereof in the second database 210 independently of the malignant codes and the evidence thereof collected under the security level of the first virtual machine 120.

Figure 2:
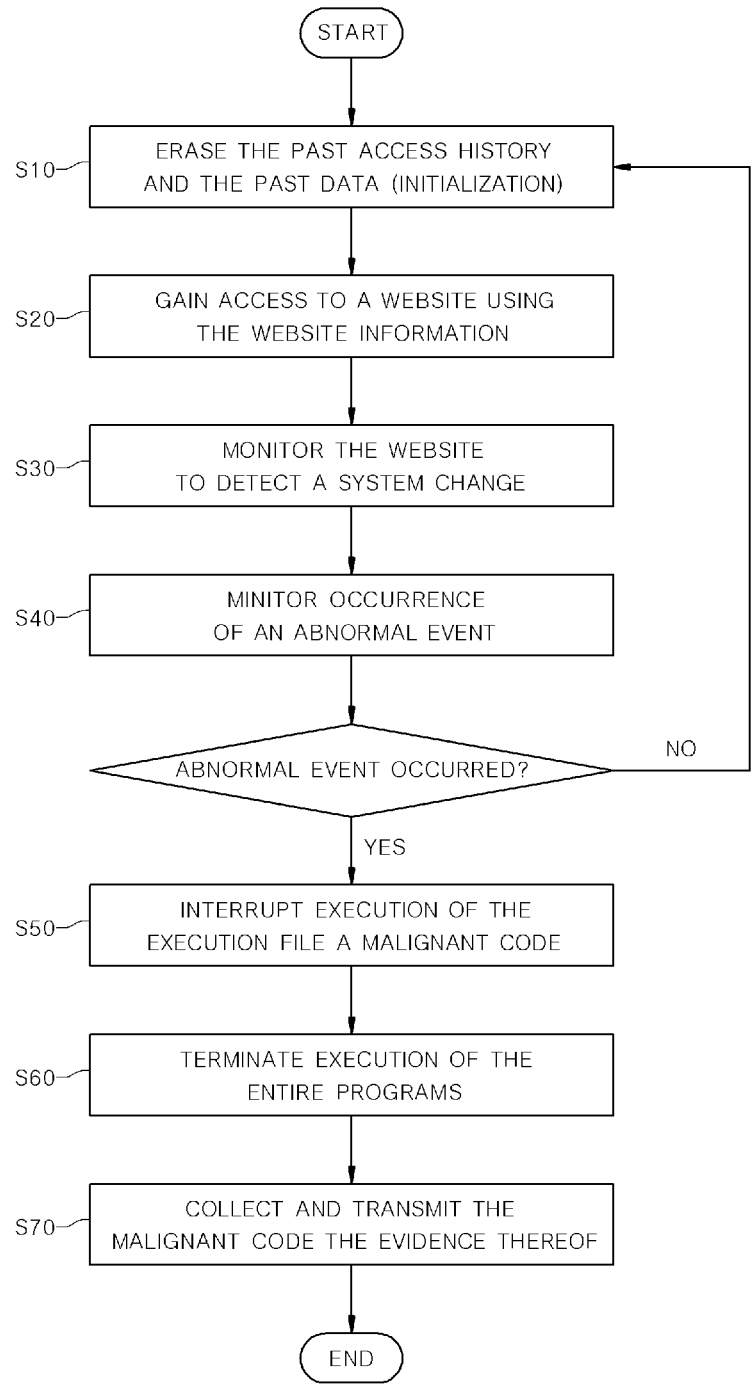
FIG. 2 is a flowchart illustrating an automatic malignant code collecting sequence performed by the automatic malignant code collecting system according to the present embodiment.

FIG. 2 is a flowchart illustrating an automatic malignant code collecting sequence performed by the automatic malignant code collecting system according to the present embodiment. In the automatic malignant code collecting sequence, malignant codes and the evidence thereof are collected by the first virtual machine 120 and the second virtual machine 130.

Referring to FIG. 2, the first virtual machine 120 and the second virtual machine 130 perform initialization for erasing the past access history and the past data, such as temporary files generated by the previous access to websites, a list of web pages, cookie information, and so forth (step S10).

After performing the initialization, the first virtual machine 120 and the second virtual machine 130 gain access to a website using the website information provided by the virtual machine controller 110 (step S20).

Then, the first virtual machine 120 and the second virtual machine 130 monitor the events occurring due to the access to the website, such as generation, deletion and execution of files, in order to detect a system change (step S30).

While monitoring the events to detect a system change, the first virtual machine 120 and the second virtual machine 130 sequentially gain access to at least one website based on the website information provided by the virtual machine controller 110.

In the course of gaining access to the website, the first virtual machine 120 and the second virtual machine 130 monitor occurrence of an abnormal event to determine whether an execution file other than a website access program (namely, a web browser) is executed or not (step S40). If it is determined that an execution file other than a website access program is not executed in the course of gaining access to the website (if an abnormal event does not occur), the first virtual machine 120 and the second virtual machine 130 perform the aforementioned initialization to erase the file generated due to the present access to the website and stay in a standby state.

On the other hand, if an execution file other than a website access program is executed in the course of gaining access to the website, namely if an abnormal event occurs, the first virtual machine 120 and the second virtual machine 130 recognize the execution file as a malignant code and interrupt the execution of the execution file (step S50). In this regard, the malignant code may be a drive-by-download type malignant code. The drive-by-download type malignant code refers to a code designed to cause a web browser to perform a task intended by an attacker, e.g., a task of executing a malignant code through the use of bugs of a web browser program, inducing collision of a web browser and secretly reading dada.

Then, the first virtual machine 120 and the second virtual machine 130 terminate execution of the entire programs which are executed to detect a system change, namely the website access program and the plug-in program (step S60).

Finally, the first virtual machine 120 and the second virtual machine 130 collect the file and the network packet generated by the execution file other than the website access program in the course of gaining access to the website, as the evidence of the malignant code, and transmit the collected information to the second database 210 (step S70). At this time, it is preferred that the first virtual machine 120 and the second virtual machine 130 transmit the collected information to the second database 210 together with the accessed website information.

As described above, the first virtual machine 120 and the second virtual machine 130 periodically gain access to a website based on a website access list and, at every access, delete the data generated by the past access.

Depending on the difference of the security levels of the first virtual machine 120 and the second virtual machine 130, the management server 300 classifies and manages the latest malignant code and the evidence thereof in the second database 210.

The occurrence of the abnormal event mentioned above is detected by a behavior-based detection method.

While one embodiment of the present invention has been described above, the present embodiment is not limited thereto but may be modified in many different forms without departing from the spirit and scope of the present invention.

What is claimed is:

1. An automatic malignant code collecting system, comprising:
   a first database configured to store detection target website information;
   a virtual machine hardware controller configured to read the website information from the first database and transmit the website information;
   a first virtual machine configured to periodically gain access to a website using the website information received from the virtual machine controller and to collect a malignant code and evidence thereof if an abnormal event occurs when the first virtual machine gains access to the website;
   a second virtual machine configured to periodically gain access to the same website as accessed by the first virtual machine using the website information received from the virtual machine controller and to collect a malignant code and evidence thereof if an abnormal event occurs when the second virtual machine gains access to the website;
   a second database configured to store the malignant code and the evidence thereof collected by the first virtual machine and the second virtual machine; and
   a management server configured to provide a user interface that enables a user to identify, on a website-by-website basis, the malignant code and evidence thereof stored in the second database,
   wherein the management server monitors security levels of the first virtual machine and the second virtual machine through an interface that makes real-time communication with the first virtual machine and the second virtual machine, and sets the security levels of the first and second virtual machines depending on a monitoring result, and
   the management server comprises a security support interface configured to automatically install a security patch having a latest security level in the second virtual machine while monitoring the security level of the second virtual machine, and to automatically update the security patch installed in the second virtual machine, if an execution file other than a website access program is executed in the course of gaining access to the website, namely if an abnormal event occurs, the first virtual machine and the second virtual machine recognize the execution file as a malignant code and interrupt the execution of the execution file,
   wherein the first virtual machine and the second virtual machine are set at different security levels,
   wherein the second virtual machine is set at a highest security level at which a latest security patch is installed in the second virtual machine,
   wherein the management server is configured to find out a latest malignant code and the evidence thereof depending on the difference between a security level set in the first virtual machine and a latest security level set in the second virtual machine and to store the latest malignant code and the evidence thereof independently of the malignant code and the evidence thereof collected under the security level set in the first virtual machine,
   wherein the first virtual machine and the second virtual machine which are set at different security levels are configured to periodically gain access to the same website and to collect a malignant code and evidence thereof.

2. The system of claim 1, wherein the virtual machine controller is configured to transmit the website information to the first virtual machine if the first virtual machine is in a standby state and to transmit the website information to the second virtual machine if the second virtual machine is in a standby state.

3. The system of claim 1, wherein the virtual machine controller is configured to simultaneously transmit the website information to the first virtual machine and the second virtual machine if the first virtual machine and the second virtual machine are in a standby state.

4. The system of claim 1, wherein the management server further comprises a security support interface configured to automatically install a security patch having a latest security level in the second virtual machine and to automatically update the security patch installed in the second virtual machine.

5. The system of claim 1, wherein the first virtual machine and the second virtual machine are configured to collect an execution file and a network packet, which are generated at the occurrence of the abnormal event, as the malignant code and the evidence thereof.

6. The system of claim 1, wherein, prior to gaining access to the website, the first virtual machine and the second virtual machine are configured to perform initialization for erasing past access history and past data generated during past access to the website.

* * * * *